Oct. 4, 1932.  H. O. HEM  1,880,443
COUNTING SCALE
Filed Oct. 31, 1928
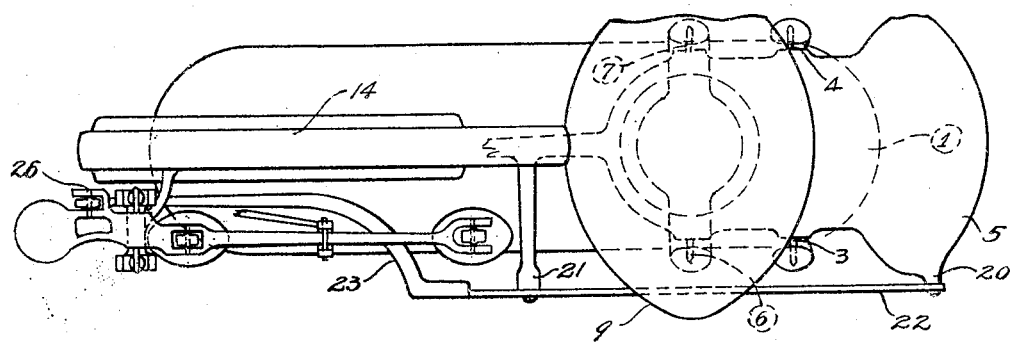
Fig. II
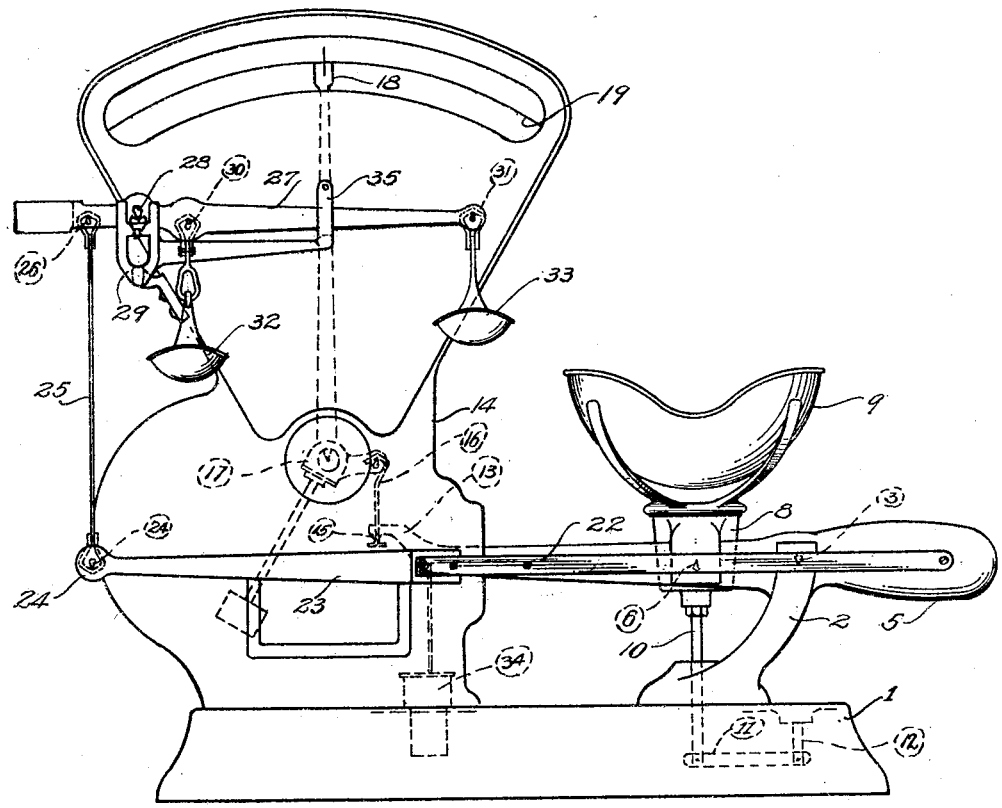
Fig. I
Inventor
Halvor O. Hem
By C O Marshall
Attorney Patented Oct. 4, 1932

1,880,443

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

COUNTING SCALE

Application filed October 31, 1928. Serial No. 316,135.

This invention relates to improvements in counting scales, and in particular to counting scales having a plurality of pans, each of which is in a fixed ratio to a commodity receiver and in which the load counterbalancing and indicating mechanism is brought to a predetermined point when a load on the commodity receiver is balanced by specimens in the ratio pans. Scales of this type are used to count like parts, for packaging and issuing stock, in industrial concerns.

One of the principal objects of this invention, is the provision of a small, compact and reliable counting scale of the type referred to.

Another object is the provision of a counting scale whereon small and light articles may be counted with great accuracy.

Another object is the provision of a counting scale having a large movement of the indicator for a small variation in the load.

A still further object is the provision of means for converting a standard weighing scale into a counting scale embodying my invention.

Other objects and advantages will be apparent from the following description, in which reference is had to the accompanying drawing illustrating a preferred embodiment of my invention and wherein similar reference numerals designate similar parts throughout the several views.

In the drawing:—

Figure I is a front elevation of a counting scale embodying my invention; and

Figure II is a plan view thereof, with parts broken away.

Referring to the drawing in detail, the scale illustrated is of the so-called fan type and is intended to be set on a table or bench.

The base 1 supports on one of its ends a forked upwardly extending fulcrum stand 2. Fulcrumed on the stand by the pivots 3 and 4 which rest in suitable bearings (not shown) is a lever 5. Load pivots 6 and 7, securely attached to the sides of the lever, carry the load supporting spider 8 and a commodity receiver 9. A depending spider stem 10 secured to the spider and extending into the hollow base, a check link 11, and the shift post 12 which is secured to the base, maintain the condition of level of the commodity receiver. The nose 13 of the lever 5 extends into a housing 14 which is mounted on the opposite end of the base 1. The nose pivot 15 secured to nose 13 of the lever 5 rests in a suitable bearing on the lower end of the connecting link 16, the upper end of which is pivotally engaged by a laterally extending arm of the pendulum 17. The indicator 18, attached to the pendulum, co-operates with a character on the chart 19, which is located in the upper end of the housing, to indicate the condition of balance.

The lever 5 is further provided with laterally extending projections 20 and 21. These form supports for the beam 22. Attached thereto is a curved member 23, which terminates in a bifurcated nose equipped with a pivot 24 which rests in the lower bearing of the connecting link 25, a similar bearing on the upper end engages a pivot 26 fixed on the ratio lever 27. This lever is fulcrumed in the ratio lever 27. This lever is fulcrumed by the pivot 28 on suitable bearings in the bracket 29 which is securely fastened to the housing 14. The lever 27 is also provided with pivots 30 and 31 from which, by suitable hangers, the ratio pans 32 and 33 are suspended. To prevent excessive movement of the lever 27, the "trig" loop 35 is provided. It is securely attached by the arm 36 to the bracket 29.

The vibratory movements of the scale are damped by a dash pot 34 located within the housing.

Assuming that the pan 33 has the ratio of 99:1 to the load receiver, and it is desired to pack like articles in lots of 100 pieces, the weight of one of the articles placed in the pan 33 acting through the lever 27, the link 25, and the lever 5 disturbs the balance of the pendulum 17 causing the normally raised weight to descend. The indicator being attached to the pendulum is moved out of registration with the character on the chart, giving a visual indication of the out-of-balance condition of the mechanism.

When a sufficient number of articles are now placed in the commodity receiver, raising the pendulum and bringing the indicator into registration with the chart, balance has again been established. It will be seen that the number of articles in the commodity receiver is in the same ratio to the article in the ratio pan as the ratio of the leverages of the pan and the commodity receiver. In this example it will be found that there are 99 articles in the commodity receiver, which with one in the ratio pan, make the desired 100.

The pan 32 suspended from the pivot 30 has a different ratio, and is used to supplement the pan 33. When it is desired to ascertain the number of articles in a lot, the articles are placed in the commodity receiver. This disturbs the balance of the scale and the indicator moves, towards the right, away from the character on the chart. The operator then takes some of the articles from the commodity receiver and places them in the ratio pan 33. As specimens are transferred from the commodity receivers to the pan 33, part of the load in the commodity receiver is counterbalanced by specimens in the ratio pan. The scale approaches the condition of balance and the indicator moves back toward the character on the chart. When so many specimens have been placed in the ratio pan 33 that the addition of another one will cause the hand to swing beyond the character, the operator begins placing specimens in the ratio pan 32. As each piece is placed in this pan the backward movement of the indicator hand is much less than the backward movement caused by placing a piece in the pan 33, but when nine or less pieces have been transferred to the pan 32, the indicator will approach so nearly to the character on the chart that the transfer of another piece will cause it to swing beyond it. The operator then takes enough pieces from the commodity receiver to cause the indicator to register as nearly as possible with the character on the chart, not placing the last pieces so taken in either of the ratio pans. Each piece in the ratio pan 33 now counterbalances ninety-nine pieces in the commodity receiver and, therefore, accounts for one hundred pieces, including itself. Each piece in the ratio pan 32 counterbalances nine pieces in the commodity receiver and, therefore, accounts for ten pieces, including itself. If, for example, the operator has placed fourteen pieces in the pan 33, seven in the pan 32 and has withdrawn three more from the commodity receiver, he will know that there are fourteen hundred and seventy-three pieces in the lot.

The scale is particularly well adapted for use in connection with the making of clerical records of counts. When the scale is used, for instance, in a receiving room for counting parts as they are received, on the receiving sheet he enters the count by hundreds, tens and units as he transfers specimens from the commodity receiver. When he transfers the necessary number of pieces to the pan 33 he puts down the number of pieces so transferred in the hundred's column or place; next he puts down the number of pieces transferred to the pan 32 in the ten's column or place, and in the unit's column he puts down the number of pieces finally withdrawn from the lot in the commodity receiver to bring the indicator as nearly as possible into registration with the character on the chart. He will thus have entered the count on the receiving sheet.

In the example the ratio assumed for the pan 33 is 99:1, and for the pan 32, 9:1. These ratios, however, may be made 100:1 and 10:1. A feature of this invention lies in the fact that the ratios may be made to suit special conditions; for example, for packing articles in gross or half-gross lots the ratio may be 144:1 or 72:1. The ratio may also be made suitable for packing sheets of paper in quires or reams.

The scale illustrated is a scale that is used extensively in trade for weighing, and for this purpose large quantities are being built resulting in a low manufacturing cost. Counting scales, on the contrary, are manufactured in comparatively small numbers and the manufacturing cost, naturally, is considerably higher. A great advantage of this invention is the fact, that by the addition of the exterior parts and the exchange of the chart within the housing 19, the weighing scale is converted into the counting scale embodying my invention. This enables the manufacturers to sell them at a lower price, resulting in a considerable saving to the public.

It will be seen from the foregoing description, that all the objects are easily and efficiently attained.

The embodiment of my invention herein shown and described is to be regarded as illustrative only, and it is to be understood that the invention is susceptible to variation, modification and change within the scope of the subjoined claims.

Having described my invention, I claim:

1. In a device of the class described, in combination, a base adapted to stand on a table, a main lever fulcrumed on one end thereof, a commodity receiver, means whereby said commodity receiver is supported on said lever, a housing mounted on said base, a projecting bracket secured to said housing, a ratio lever fulcrumed on said bracket, a plurality of ratio pans, said ratio pans being supported on said ratio lever, the leverage of the ratio pans having a fixed ratio to, and acting in opposition to said commodity receiver, an index pivotally mounted in said housing, a nose portion of said main lever projecting into said housing and operatively connected to said index, said index including a pendulum, a chart co-operating with said index and having a single indicium, said chart being located within said housing, a portion of said main lever extending beyond the nose portion, exteriorly of the housing and means including a link having pivotal bearings on either end thereof for connecting said ratio lever to said main lever.

2. In a counting scale, in combination, a commodity receiver, a lever mechanism supporting said commodity receiver, a fan type housing, indicating means located within said fan type housing, said indicating means including a single indicium located at a predetermined point, a plurality of ratio pans, and lever mechanism supporting said plurality of ratio pans, said lever mechanism being supported by said housing, the leverage of said ratio pans being invariable, the leverage of one of said ratio pans being ninety-nine times that of said commodity-receiver and the leverage of the other of said ratio pans being nine times that of said commodity-receiver.

3. In a counting scale, in combination, a main lever of the second order, a commodity-receiver means whereby said commodity receiver is supported by the load pivot of said lever, an auxiliary lever of the first order, means connecting the nose pivot of said main lever to said auxiliary lever, two ratio pans supported by said auxiliary lever, the leverage of each of said ratio pans being invariable, the leverage of one of said ratio pans being ninety-nine times that of said commodity-receiver and the leverage of the other of said ratio pans being nine times that of said commodity-receiver, automatic load-counterbalancing and indicating mechanism, and means connecting said automatic load-counterbalancing and indicating mechanism to one of said levers.

4. In a counting scale, in combination, a main lever of the second order, a commodity-receiver means whereby said commodity-receiver is supported by the load pivot of said lever, an auxiliary lever of the first order, means connecting the nose pivot of said main lever to said auxiliary lever, two ratio pans supported by said auxiliary lever, the leverage of each of said ratio pans being invariable, the leverage of one of said ratio pans being ninety-nine times that of said commodity-receiver and the leverage of the other of said ratio pans being nine times that of said commodity-receiver, automatic load-counterbalancing and indicating mechanism, and means connecting said automatic load-counterbalancing and indicating mechanism to one of said levers, said indicating mechanism including a chart having a single indicium.

5. In a counting scale, in combination, a main lever of the second order, a commodity-receiver means whereby said commodity-receiver is supported thereby, a housing, automatic load-counterbalancing and indicating mechanism supported within said housing, means connecting said main lever to said automatic load-counterbalancing and indicating mechanism, an auxiliary lever of the first order supported by said housing, means connecting the nose of said main lever with said auxiliary lever, and two ratio pans supported by said auxiliary lever, the leverage of each of said ratio pans being invariable.

6. In a counting scale, in combination, a main lever of the second order, a commodity-receiver means whereby said commodity-receiver is supported by said lever, a housing, automatic load-counterbalancing and indicating mechanism supported within said housing, means connecting said main lever to said automatic load-counterbalancing and indicating mechanism, an auxiliary lever of the first order supported by said housing, means connecting the nose of said main lever with said auxiliary lever, and two ratio pans supported by said auxiliary lever, the leverage of each of said ratio pans being invariable, the leverage of one of said ratio pans being ninety-nine times that of said commodity-receiver and the leverage of the other of said ratio pans being nine times that of said commodity-receiver.

7. In a counting scale, in combination, a main lever of the second order, a commodity-receiver means whereby said commodity-receiver is supported by said lever, a load-counterbalancing pendulum, an indicator fixed thereto, means connecting said pendulum and said main lever, an auxiliary lever of the first order, means connecting said main lever and said auxiliary lever, and two ratio pans supported by said auxiliary lever, the leverage of each of said ratio pans being invariable.

8. In a counting scale, in combination, a main lever of the second order, a commodity-receiver means whereby said commodity-receiver is supported by said lever, a load-counterbalancing pendulum, an indicator fixed thereto, means connecting said pendulum and said main lever, an auxiliary lever of the first order, means connecting said main lever and said auxiliary lever, and two ratio pans supported by said auxiliary lever, the leverage of each of said ratio pans being invariable, the leverage of one of said ratio pans being ninety-nine times that of said commodity-receiver and the leverage of the other of said ratio pans being nine times that of said commodity-receiver.

HALVOR O. HEM.